Jan. 16, 1973   P. E. COFFEY   3,711,248
METHOD AND APPARATUS FOR MERCURY CONCENTRATION MEASURIMENT
Filed July 28, 1971   2 Sheets-Sheet 1

INVENTOR
PETER E. COFFEY

Charles W. Helzer
ATTORNEY

Jan. 16, 1973   P. E. COFFEY   3,711,248
METHOD AND APPARATUS FOR MERCURY CONCENTRATION MEASUREMENT
Filed July 28, 1971   2 Sheets-Sheet 2

FIG. 3

INVENTOR
PETER E. COFFEY

Charles W. Helzer
ATTORNEY

United States Patent Office 3,711,248
Patented Jan. 16, 1973

3,711,248
METHOD AND APPARATUS FOR MERCURY CONCENTRATION MEASUREMENT
Peter E. Coffey, Schenectady, N.Y., assignor to Environment/One Corporation, Schenectady, N.Y.
Filed July 28, 1971, Ser. No. 166,945
Int. Cl. G01n 21/26
U.S. Cl. 23—230 R                    14 Claims

ABSTRACT OF THE DISCLOSURE

Accurate determination of the concentration, calculated as elemental mercury, of a sample gaseous, liquid or solid medium containing mercury, either in elemental or reducible form, is obtained by (1) the reduction of mercury containing compounds where necessary to elemental mercury in vapor form;
(2) conversion of the mercury content to condensation nuclei; and
(3) the measurement of the resultant condensation nuclei to yield an accurate indication of the concentration, calculated as elemental mercury, of mercury in the sample medium.

BACKGROUND OF THE INVENTION

Field of the invention

This invention relates to a new and improved apparatus and method for determining and accurately measuring the mercury content, calculated as elemental mercury, of a sample medium. Due to the nature of the novel apparatus and method employed in the present invention, the sample medium can be gaseous, liquid or solid. It is therefore possible, in accordance with the present invention, to determine and accurately measure the mercury content of any sample medium containing elemental mercury or a mercury compound which is capable of reduction to the elemental state.

Prior art problem

The problem of mercury contamination has recently given rise to a realization of the need for an improved means and method for the accurate and rapid determination of the mercury content of a sample medium. It has further been discovered that there is a necessity for calculating or determining the mercury content of a sample medium in terms of a common factor. Heretofore there have been devices through which gas streams have been passed to determine the mercury content thereof. Such devices have relied upon the use of material such as activated carbon or the like, which have a propensity to adsorb mercury. Examples of such prior art applications may be found, for example, in U.S. Pats. 3,178,572 and 3,281,596. Such applications have, however, been both slow and somewhat inaccurate due to the stated problems in the quantitative analysis of the adsorbed material. Further, such methods have been limited to test samples of a gaseous medium.

SUMMARY OF THE INVENTION

It is therefore a primary object of the present invention to provide a new and improved means and method for detecting the presence of mercury, including all compounds of mercury which can be reduced to elemental form, in a gaseous, liquid or solid medium.

It is a further object of the present invention to provide a new and improved means and method for the accurate detection and measurement of extremely dilute concentrations of mercury (1.0 nanogram/m.$^3$) in samples of a gaseous medium (e.g. air).

It is still a further object of the present invention to provide a new and improved means and method for the accurate detection and measurement of minute quantities of mercury and/or reducible mercury containing compounds (0.01 p.p.m.) in samples of a liquid or solid medium.

In accordance with the present invention when a gaseous sample is being tested the mercury present in the sample is collected as an amalgam on a gold or silver collector element presented to the sample for this purpose. The mercury thus collected is vaporized by heating the collector element in a low temperature oven. The mercury vapor thus produced is passed through ultraviolet light where a proportionate amount of the mercury vapor is converted into submicron particles known as condensation nuclei. The number of condensation nuclei thus produced is measured by a condensation nuclei detector. This measurement is a function of the mercury vapor concentration of the sample and thus a direct reading of the concentration can be readily obtained.

When it is desired to measure the mercury concentration in a liquid sample, this may be accomplished by using known chemical procedures to reduce the mercury compounds to the elemental state. Such procedures may involve the use of mild reducing agents such as sodium carbonate and hydrazine hydrate as reagents. A method for use when the sample is solid may employ the addition of concentrated sulphuric acid together with solutions of hydroxylamine hydrochloride and stannous chloride. Following reduction of any mercury compounds in the sample to the elemental state, the sample is heated in a low temperature oven while clean air is bubbled through the sample to remove the mercury contained therein in the form of mercury vapor which is in turn converted into condensation nuclei.

The action of the heat of the low temperature oven (about 360° C.) on the amalgam vaporizes the mercury content. A stream of clean (mercury free) air is passed across the surface of the amalgam to carry off the vaporized mercury into a conversion unit. The amount of mercury present in the amalgam is measured by converting a proportionate amount of the mercury vapor into condensation nuclei which are then measured with a known condensation nuclei monitor (hereinafter referred to as a c.n. counter). Condensation nuclei are small airborne particles ranging in diameter from $10^{-3}$ to $10^{-1}$ micron.

The portion of the sample containing the condensation nuclei may then be reunited with the remainder of the original measured quantity of clean air plus evolved mercury vapor to insure volumetric uniformity. Within the c.n. monitor, the air sample containing the condensation nuclei is brought to 100 percent humidity and then expanded adiabatically within a cloud chamber into a near vacuum. A super-saturation condition immediately exists within the chamber, and, within milliseconds, the nuclei serve as condensation centers for the excess water vapor. The resultant droplets are detected by a light field optics system which is capable of detecting as few as 300 condensation nuclei per cubic centimeter or less than $10^{-16}$ gm./cc. of submicron particles in the test atmosphere.

In the present invention the formation of the condensation nuclei which are in the form of mercuric oxide condensation nuclei, is accomplished by passing a proportionate amount of the mercury vapor over a mercury ultraviolet lamp. The mercury atoms in the vapor absorb radiation energy and attain an activated state. Upon collision with an oxygen molecule (from the clean air) the activated mercury atoms will be oxidized, forming mercuric oxide condensation nuclei.

The above procedure has been found to result in a highly sensitive and accurate method and apparatus for the detection of mercury concentration. Theoretically, there is no limit to the sensitivity of the method of the present invention. However, in a preferred form of the apparatus and method, requisite time factors for efficient operation locates the range of operation to lie between a lower limit of a concentration of about 1 nanogram to 1000 nanograms per cubic meter in one liter samples of atmospheric air.

The apparatus of the present invention can be used in aircraft and land vehicles. In airborne operations the sample collecting tube containing the mercury concentration could be suspended in the airstream, allowing the air to be sampled to be drawn therethrough. A small fan could be used to create the requisite air flow in vehicular operations. It has been found advantageous in sampling atmospheric contamination to employ two or more concentrators which can be programmed in series through the collection and heating cycle, yielding an accurate continuous sample.

DESCRIPTION OF THE DRAWINGS

Other objects, features, and many of the attendant advantages of this invention will be appreciated more readily as the same become better understood by reference to the following detailed description, when considered in connection with the accompanying drawings, wherein like parts in each of the figures are identified by the same reference character, and wherein:

FIG. 3 is a functional block diagram of an apparatus used in carrying out the new and improved method of measuring the concentration level of mercury in a test sample collector made possible by the present invention.

DETAILED DESCRIPTION OF THE PREFERRED EMBODIMENT

In carrying out the new and improved method of measuring the concentration level of mercury, calculated as elemental mercury, in gaseous, liquid or solid samples in accordance with the present invention, a suitable apparatus is employed, depending on the nature of the sample being tested to concentrate the mercury content into a form suitable for test purposes.

Figure 1:
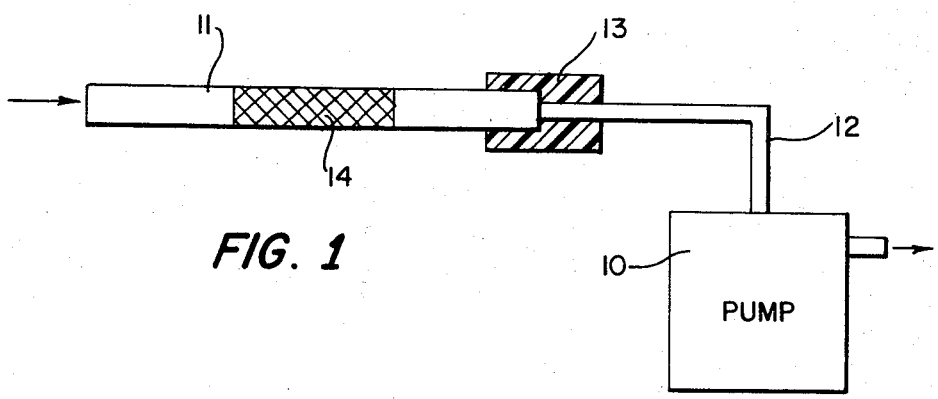
FIG. 1 is a functional block diagram of an atmospheric sample collector in accordance with the present invention.

A suitable apparatus for the collection of a sample from a gaseous medium is shown in FIG. 1. A pump 10 is employed to draw a predetermined volume of the sample gaseous medium through a sample cartridge 11. The sample cartridge 11 is connected to the pump 10 through conduit 12 by resilient sealing means 13. The sample cartridge 11 contains an amalgam forming collecting surface 14 which is preferably of gold or silver. As the gaseous sample is drawn through the sample cartridge 11 under action of the pump 10, the mercury content of the gaseous sample will form an amalgam with the collecting surface 14. Thus, the mercury present in the measured sample will be collected in the sample cartridge 11. The pump 10 may be of any suitable, known construction.

Figure 2:
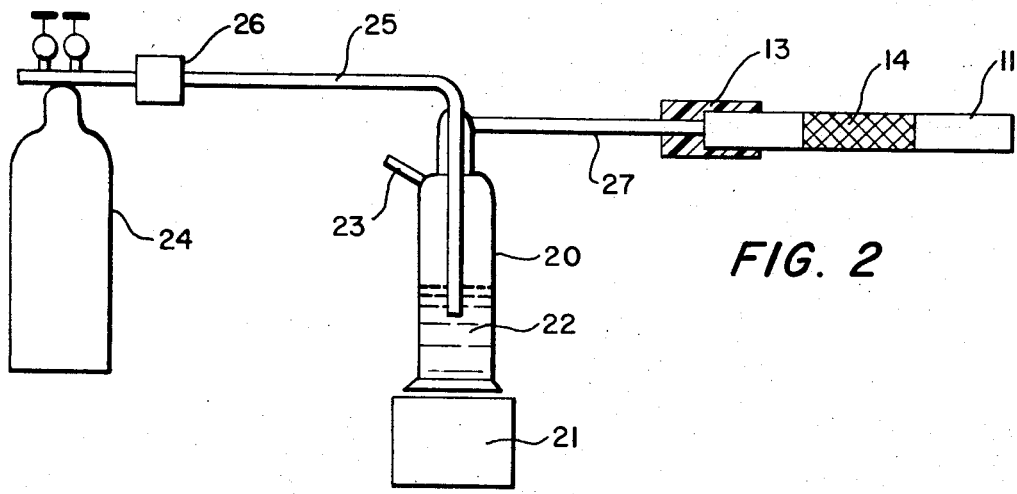
FIG. 2 is a functional block diagram of a sample detector for use in sampling liquid or solid samples.

FIG. 2 illustrates apparatus suitable in accordance with the present invention for releasing the mercury content from a liquid or solid test sample and subsequently collecting this mercury content in a sample cartridge 11 having a suitable collecting surface 14. In this embodiment, a reaction vessel 20 is continually stirred through the action of a magnetic stirrer 21 or the like. The reaction vessel contains a suitable quantity of the proper reagent 22 for the composition of the test material to be studied. Such reagents for example, in the case of a liquid test sample may consist of any suitable reducing agent such as sodium carbonate and hydrazine hydrate. In the case of solid material test samples it is necessary to break down or dissolve the sample to expose the mercury containing compounds to the action of the reducing agents. A strong acid such as concentrated sulphuric acid can be employed to break down the test sample while a compatible reducing agent such as hydroxylamine hydrochloride or stannous chloride can be incorporated into the reagent mixture to reduce the mercury containing compounds to elemental mercury.

The reaction vessel 20 is preferably closed to the outside atmosphere to prevent contamination of the test sample-reagent mixture. The test sample, either in solid or liquid form, can be introduced into the reaction vessel 20 through an entrance port 23. A source 24 of clean air or mercury free gas, such as a compressed air cylinder, is connected through a tubular conduit 25 into the reaction vessel 20 and supplies gas which is bubbled through the test sample-reagent mixture. The flow from the source 24 of clean air is controlled by a flow meter 26 to insure proper and uniform flow. It has been found that a flow of about 3 liters per minute will produce satisfactory results.

The action of the reagent 22 in the reaction vessel 20 serves to reduce any mercury containing compounds in the test sample to elemental mercury. The action of the clean air bubbling through the reagent-test sample mixture in the reaction vessel 20 will pick up the thus reduced mercury and it will pass through tubular conduit 27 into sample cartridge 11. The sample cartridge is connected to the conduit 27 by resilient sealing connector means 13.

The mercury content of the air stream passing through the sample cartridge 11 will be collected on the collecting surface 14 as described above.

Referring to FIG. 3, there is shown a preferred embodiment of apparatus for testing the sample cartridge 11 which has been used in collecting samples by means of either of the embodiments of FIGS. 1 and 2.

A sample cartridge 11 is mounted by resilient means 30 and 35 in a low temperature oven 31. The oven 31 can be heated by electrical heating coil means 32 which are electrically connected by wires 44 and 45 to a controlled source of power 46 to insure close control and uniformity of temperature. A source 33 of clean air is connected through conduit 34 to the sample cartridge 11. In areas having a low level of pollution (i.e. clean air), the source 33 may be replaced by an air intake and particle filter, together with a suitable pump for causing a flow of air through the system. The conduit 34 and the sample cartridge 11 are connected by resilient sealing means 35 that can also serve to mount the cartridge within oven 31. The sample cartridge 11 is in turn connnected by tubular conduit 36 to a mercury converter 37. The flow rate of the source 33 of clean air is preferably controlled by a flow meter 38 and outlet flow control valve 39. A suitable flow rate has been found to be about 30 ml./sec. The clean air from the source should be free of mercury, sulphur compounds and carbon monoxide. Suitable clean air sources 33 are commercial compressed air or bottled gas.

The mercury converter 37 which will be more fully described hereinafter is connected to a condensation nuclei counter 47 by conduit 40. The condensation nuclei counter 47 may have indicator means 41 for providing a visual indication of the reading obtained. In addition, the condensation nuclei counter 47 may be connected by circuit 42 to a conventional chart recorder 43 which will provide a permanent record of the testing results.

In the operation of the present invention, the sample cartridge 11 which has been exposed to the mercury content of the test sample through the means shown in FIG. 1 or 2, depending on the nature of the test sample, is mounted in the low temperature oven 31 where it is held in place and one end is connected to the conduit 36 through resilient mounting means 30. Resilient connecting means 35 connects the opposite end of the sample cartridge 11 to the source 33 of clean air through conduit 34. Preferably the oven 31 has been preheated to operating temperature (about 360° C.) prior to insertion of the cartridge and this temperature will be maintained throughout the operation.

The flow meter 38 and/or valve 39 are adjusted to permit the controlled and measured flow of clean air from the source 33 through the conduit 34 through the sample cartridge 11. The action of the heat in the oven 31 causes the collected mercury on the collector 14 of the sample cartridge 11 to vaporize. The mercury vapor thus evolved is carried by the measured flow of clean air through the conduit 36 into the mercury converter 37 where it is first filtered to remove any condensation nuclei particles that might be entrained in it.

The mercury converter unit 37 acts to convert the thus evolved and filtered mercury vapor from the sample cartridge 11 into submicron particles which are condensation nuclei and which can in turn be quantitatively measured by the condensation nuclei counter 47. The converter unit 37 may constitute any suitable, known activation means for converting the mercury vapor into mercuric oxide particles in the submicron size range. Such activation means include a source of ultraviolet light, a hot platinum wire, a spark gap and the like. The preferred converter is a mercury ultraviolet lamp. In the converter 37 the mercury atoms after excitation by the activation means combine with oxygen contained in the clean air to form mercuric oxide particles that act as condensation nuclei. These condensation nuclei are then passed through conduit 40 into a condensation nuclei counter 47.

For a detailed description of the construction and operation of the condensation nuclei counter 47, reference is made to U.S. Pat. 2,684,008 issued on July 20, 1954 to Bernard Vonnegut, which is incorporated herein. In the condensation nuclei counter the sample to be tested is first humidified and then introduced into an expansion chamber where it periodically is expanded by means of a cyclically driven flexible diaphragm or valved vacuum system. This results in alternately expanding the volume of the chamber thus periodically subjecting the air (and entrained condensation nuclei) in the chamber to an adiabatic expansion.

During the expansion, the air within the container is adiabatically cooled causing supersaturation and in turn condensation of the water vapor about the nuclei. The chamber is traversed by a beam of light which is scattered by the cloud of droplets within the chamber. The scattered light produces an electric signal which is a measure of the condensation nuclei present. In a complete operating cycle, the expansion chamber is returned to normal ambient condition intermediate each expansion causing the droplets to be evaporated and the thus expanded and tested air sample to be flushed through an exhaust conduit 44. The cycle of operation is then repeated to provide a continuous indication on the meter 41 of the number of condensation nuclei present, and hence the concentration of mercury calculated as elemental mercury present in the sample being tested.

A further continuously operable embodiment of the present invention is available for use under conditions where substantially continuous measurement of the mercury concentration is required simultaneously with the obtainment of the sample in the sample cartridge 11. With this embodiment of the invention, a measured gaseous sample of the atmosphere to be tested is drawn directly into the sample cartridge 11 periodically through means of a sample intake shown in dotted outline form at 51. The sample intake 51 may be an air scoop mounted on an airplane, etc., which provides sufficient ram pressure to cause flow of a sample gas through the sampling system, in which event a valve 52 included in the conduit connecting intake 51 to sample cartridge 11 would have to be capable of regulating flow as well as act as a stop valve periodically. Alternatively, two valves for performing each function separately, could be employed. In the event of use under conditions where there is no naturally occurring sample atmosphere flow, a high volume displacement pump 53 of any suitable construction would be connected through a stop valve 54 to the conduit 36 connecting cartridge 11 to the inlet of mercury converter 37. In addition, stop valves 55 and 56 are connected in conduits 36 and 34, respectively, with valve 55 at a point intermediate the branch line to high volume pump 53 and the intake to converter 37, and valve 56 intermediate clean gas cylinder 33 and the inlet side of filter cartridge 11.

For continuous operation of the system as thus modified valves 52 and 54 are driven synchronously with valves 55 and 67 by a suitable valve drive mechanism (not shown) that operates synchronously with the periodic expansion cycles of the c.n. counter 11. For this purpose, valves 52, 54, 55 and 56 could be solenoid actuated valves that are controlled by cam-actuated switches driven synchronously with the operating cycles of the c.n. counter 47. The arrangement is such that valves 52 and 54 first open and valves 55 and 56 close, simultaneously to draw a sample of the atmosphere being monitored into the sample cartridge 11. Thereafter, valves 52 and 54 close and valves 55 and 56 open together with energization of the heating coil 32 to drive out the elemental mercury vapor trapped in the filter cartridge 11 as described previously, while measuring the condensation nuclei count with meter 41 and/or chart recorder 43. It might be noted at this point that the c.n. counter includes a pump for causing a flow of gas through the system including the c.n. counter while it is connected through valve 55 to sample cartridge 11.

This cycle of operation is then repeated periodically at some predetermined sampling rate suitable for the monitoring function to be performed.

From the foregoing description, it can be appreciated that the invention provides a new and improved method and apparatus for measuring the concentration level of mercury, calculated as elemental mercury, in gaseous, liquid or solid test samples. This method and apparatus is highly accurate and is capable of determining small concentration levels of mercury and makes available a new scientific tool with which it is possible to investigate phenomenon heretofore only discoverable at best with extreme difficulty. The apparatus and method also is capable of use as a detector for certain metallic ore deposits by detecting the quantities of evolved mercury vapor characteristic of such deposits. The apparatus and method of the present invention incorporates all of the above characteristics, yet is constructed of readily available components, is simple in design, and reliable in operation, and further may be practiced in two separate steps of sample gathering and subsequent measurement at the convenience of the user, or the two steps may be carried out substantially simultaneously in a continuous monitoring operation.

Obviously, other modifications and variations of the invention are possible in the light of the above teachings. It is, therefore, to be understood, that changes may be made herein which are within the full intended scope of the invention as defined by the appended claims.

I claim:

1. A method of measuring the concentration level of mercury vapor in a sample atmosphere which comprises obtaining a sample of the atmosphere to be studied, selectively removing the mercury content of the sample by contact with an amalgam forming material selected from the group consisting of gold and silver, heating the amalgam to vaporize the mercury, converting the mercury vapor to condensation nuclei and measuring the condensation nuclei thus formed to determine the concentration level of mercury vapor in the sample atmosphere.

2. The method of claim 1, including the step of supplying clean air during the heating of the amalgam to vaporize the mercury.

3. A method of measuring the concentration of mercury and reducible mercury compounds as the equivalent concentration of elemental mercury in a sample liquid which comprises obtaining a sample of the liquid to be studied, reducing any mercuric or mercurous compounds contained therein to elemental mercury, bubbling clean air through the liquid to remove the elemental mercury as mercury vapor, collecting the mercury vapor as an amalgam by contact with an amalgam forming metal selected from the group consisting of gold and silver, heating the amalgam to vaporize the mercury, converting the mercury vapor to condensation nuclei and measuring the condensation nuclei thus formed to determine the equivalent concentration of elemental mercury in the sample liquid.

4. A method of measuring the concentration of mercury and reducible mercury compounds as the equivalent concentration of elemental mercury in a sample solid which comprises obtaining a sample of the solid to be studied, dissolving the sample to free the contained mercury compounds, reducing any mercuric or mercurous compounds contained therein to elemental mercury, bubbling clean air through the dissolved sample to remove the elemental mercury as mercury vapor, collecting the mercury vapor as an amalgam by contact with an amalgam forming metal selected from the group consisting of gold and silver, heating the amalgam to vaporize the mercury, converting the mercury vapor to condensation nuclei and measuring the condensation nuclei thus formed to determine the equivalent concentration of elemental mercury in the sample solid.

5. An instrument for measuring the concentration level of mercury in a test sample container means containing an amalgam of mercury with a metal selected from the group consisting of gold and silver, comprising in combination a test sample container means open at first and second ends, heating means for vaporizing the amalgam of mercury in the test sample container means, said heating means including mounting means for mounting the test sample container means therein at one end thereof, a source of clean air, first conduit means connecting said source of clean air to a first end of the test sample container means for passage of the clean air therethrough, second conduit means connected at one end thereof to the second end of the test sample container means for receiving the combined mercury vapor and clean air from the test sample container means, and mercury conversion means connected to said second conduit means for receiving the combined mercury vapor and clean air therefrom and converting the combination to mercuric oxide condensation nuclei.

6. The instrument of claim 5 further including condensation nuclei counting means connected to said mercury conversion means for measuring the condensation nuclei thus formed whereby the concentration level of mercury in the test sample container means being studied can be determined.

7. The instrument of claim 6, wherein the heating means comprises an electrically heated oven capable of maintaining a temperature of about 360° C.

8. The instrument of claim 7, wherein the first conduit means includes a flow meter for regulating the flow of clean air therethrough.

9. The instrument of claim 8, wherein said condensation nuclei counting means includes visual indication means for indicating the value of the condensation nuclei count.

10. The instrument of claim 9, including chart recorder means connected to said condensation nuclei counting means for recording the concentration level measured thereby.

11. The instrument of claim 6, further including automatically operable valving means for automatically supplying samples to the test sample container means, and subsequently from the test sample container means to the mercury conversion means on a periodically operating, continuous monitoring basis.

12. The instrument of claim 11, wherein the heating means comprises an electrically heated oven capable of maintaining a temperature of about 360° C.

13. The instrument of claim 12, wherein the first conduit means includes a flow meter for regulating the flow of clean air therethrough.

14. The instrument of claim 13, further including chart recorder means connected to said condensation nuclei counting means for recording the concentration level measured thereby.

References Cited

UNITED STATES PATENTS 3,178,572   4/1965   Williston _____ 250—43.5 R

MORRIS O. WOLK, Primary Examiner

R. M. REESE, Assistant Examiner

U.S. Cl. X.R.

23—253 R; 250—43.5 R